United States Patent
Itoh et al.

(10) Patent No.: US 6,895,917 B2
(45) Date of Patent: May 24, 2005

(54) AUTOMATIC STOP/START CONTROLLER FOR ENGINE

(75) Inventors: Yoshiki Itoh, Shizuoka-ken (JP);
Tatsuji Mori, Shizuoka-ken (JP);
Norihiro Noda, Shizuoka-ken (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 39 days.

(21) Appl. No.: 10/761,179

(22) Filed: Jan. 20, 2004

(65) Prior Publication Data

US 2004/0149246 A1 Aug. 5, 2004

(30) Foreign Application Priority Data

Jan. 21, 2003 (JP) ....................................... 2003-012128

(51) Int. Cl.[7] ................................................. B60H 1/00
(52) U.S. Cl. ........................ 123/179.4; 62/133; 62/158; 62/228.1
(58) Field of Search ................................ 123/179.3, 179.4, 123/179.5; 62/132, 133, 158, 228.1, 236

(56) References Cited

U.S. PATENT DOCUMENTS

| | | | | |
|---|---|---|---|---|
| 5,317,998 A | * | 6/1994 | Hanson et al. | 123/179.4 |
| 5,934,089 A | * | 8/1999 | Nakagawa et al. | 62/133 |
| 6,532,926 B1 | * | 3/2003 | Kuroda et al. | 123/179.4 |
| 6,644,055 B2 | * | 11/2003 | Ohta et al. | 62/228.5 |

FOREIGN PATENT DOCUMENTS

| | | |
|---|---|---|
| JP | 2001-341515 | 12/2001 |
| JP | 3305974 | 5/2002 |
| JP | 3323097 | 6/2002 |

* cited by examiner

*Primary Examiner*—Mahmoud Gimie
*Assistant Examiner*—Arnold Castro
(74) *Attorney, Agent, or Firm*—Flynn, Thiel, Boutell & Tanis, P.C.

(57) ABSTRACT

An automatic stop/start controller for an engine, having an air conditioner which employs a coolant or driving force of the engine to control the air in a driver's compartment. The engine can be stopped and started without operation of an ignition key. After a predetermined automatic stop condition is satisfied and the engine is automatically stopped, a control unit maintains the engine in a stopped state as long as the duration of an automatic stop of the engine is shorter than an automatic stop maximum time set based on air temperature at an inlet of the air conditioner.

8 Claims, 4 Drawing Sheets

AUTOMATIC STOP/START CONTROLLER FOR ENGINE

CROSS REFERENCES TO RELATED APPLICATIONS

This application is related to the following copending applications: (1) Ser. No. 10/761,177 filed concurrently herewith, and titled "AN AUTOMATIC STOP/START CONTROLLER FOR AN ENGINE"; (2) Ser. No. 10/761,178 filed concurrently herewith, and titled "AUTOMATIC STOP/START CONTROLLER FOR ENGINE"; and (3) Ser. No. 10/761,176 filed concurrently herewith, and titled "AUTOMATIC STOP/START CONTROLLER FOR ENGINE", the entire disclosures of which are herein incorporated by reference.

FIELD OF THE INVENTION

This invention relates to an automatic stop/start controller for an engine, and more particularly to an automatic stop/start controller for a vehicle engine which prevents degradation of heating performance of an air conditioner when the engine is stopped so as to maintain the heating performance, which engine is stopped and started without operation of an ignition key.

BACKGROUND OF THE INVENTION

Some vehicles are equipped with an automatic stop/start controller which automatically stops and starts the vehicle engine, without operation of an ignition key, in order to improve fuel economy. Some of these vehicles are provided with an air conditioner, and the coolant of the engine is employed as a heat source for heating the vehicle, while the driving force of the engine is employed to drive an air conditioner compressor for cooling the vehicle interior. However, stopping of the engine by the automatic stop/start controller results in degradation of the heating or cooling performance.

One traditional automatic stop/start controller to address these problems includes an engine for drive, a motor, an air conditioner which employs a coolant or driving force of the engine, an engine controller to start/stop the engine according to the driving state, and an air conditioner controller to start/stop the air conditioner. A target temperature of output air that is sent to the driver's compartment of the vehicle is determined, and the engine is operated to permit air conditioning when this target temperature is at such a temperature that the driver's compartment needs air conditioning (see JP No. 3323097).

Another conventional automatic stop/start controller includes an engine, a motor, and an air conditioner to control the temperature by a refrigerating cycle created by a compressor and an evaporator in the vehicle. When the vehicle is stopped, if it is determined that the temperature of the air is below a predetermined temperature after evaporation, then the engine is required to start to maintain the cooling performance (see JP No. 3305974).

Further, another conventional automatic stop/start controller includes an air conditioner in a vehicle in which an engine is automatically stopped or started based on the driving state. The engine is prevented from automatic stopping so as to maintain air conditioning performance when a blower fan of the air conditioner is activated and the operational switch for the air conditioning is activated and the temperature of the outer air is below a predetermined temperature (see JP Laid-Open No. 2001-341515).

The conventional air conditioner on the vehicle having an automatic stop/start controller is a so-called automatic air conditioner system in that the system automatically controls the air in the driver's compartment to be at a set temperature. This automatic air conditioner cannot be applied to a so-called manual type air conditioner that manually controls the quantity of air, an air mix damper, and an outlet.

Although some of the conventional vehicle air conditioners having an automatic stop/start controller may be applied to the manual-type air conditioner, the heating performance cannot be maintained, since it is designed to keep the cooling performance by stopping the engine when the air temperature after the evaporation is below a predetermined temperature, thereby saving fuel.

SUMMARY OF THE INVENTION

In order to obviate or minimize the above-mentioned inconveniences, the present invention provides an automatic stop/start controller for a vehicle engine, having an air conditioner which employs a coolant or driving force of the engine to control the air in the driver's compartment. The engine can be stopped and started without operation of an ignition key. After a predetermined automatic stop condition is satisfied and the engine is automatically stopped, a control unit maintains the stopped condition of the engine while the duration of the automatic stop of the engine is shorter than an automatic stop maximum time set based on an air temperature at an inlet of the air conditioner.

According to the present invention, after the predetermined automatic stop condition is satisfied and the engine is automatically stopped, the control unit maintains a stopped condition of the engine while the duration of the automatic stop of the engine is shorter than the automatic stop maximum time set based on an air temperature at the inlet of the air conditioner. Therefore, the engine can be started before the inlet air temperature at the air conditioner becomes at a low temperature due to the fact that the coolant is not circulated when the engine is stopped. This prevents the degrading of the heating performance due to the low temperature of the coolant during the engine stoppage.

DETAILED DESCRIPTION OF THE INVENTION

The present invention is described in specific detail as follows with reference to the Figures wherein FIGS. 1–4 illustrate an embodiment of the present invention.

Figure 3:
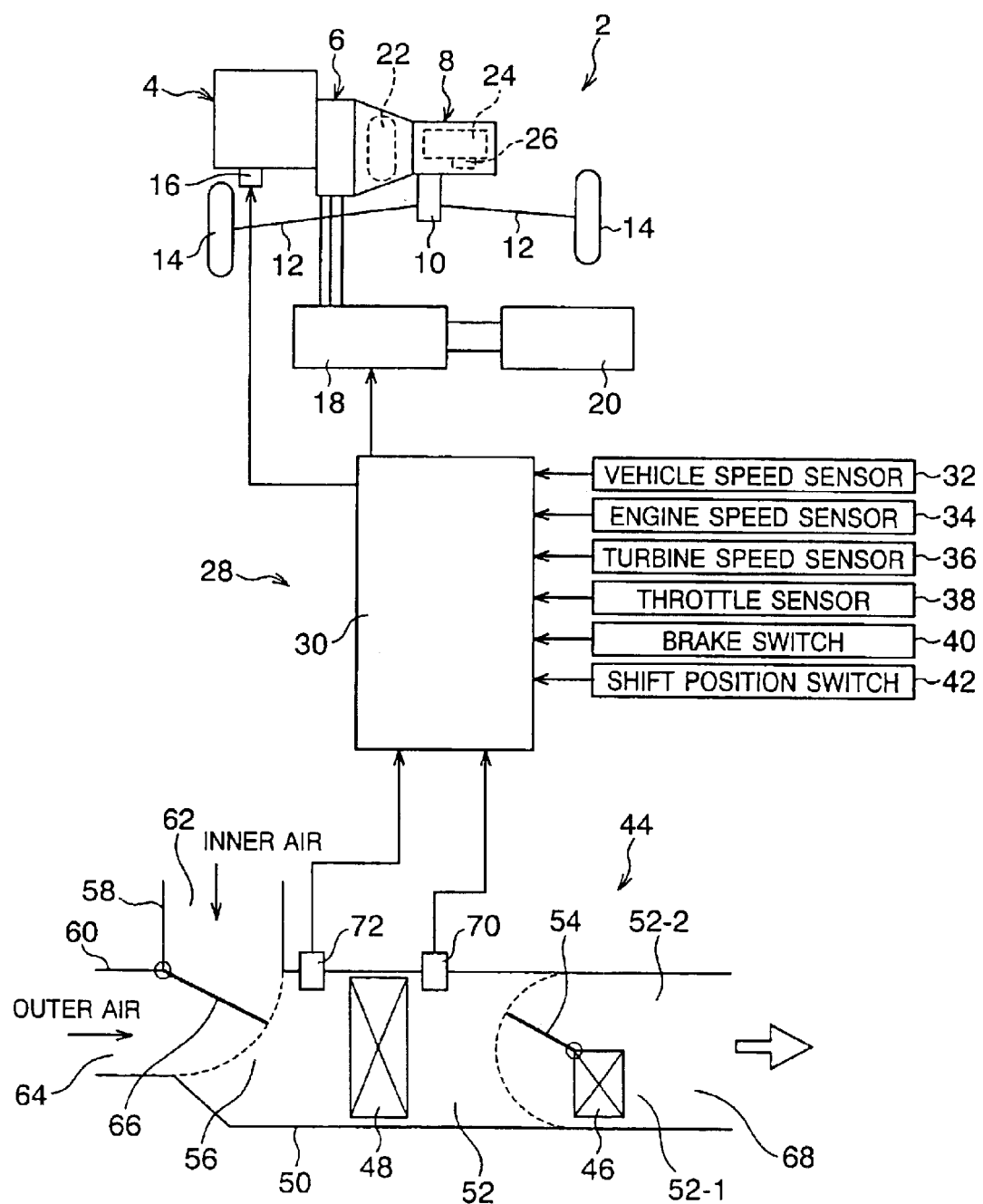
FIG. 3 is a schematic diagram of the automatic stop/start controller.

FIG. 3 shows a vehicle 2 including an internal combustion engine 4, an electric motor generator 6, and an automatic transmission 8. The vehicle 2 is equipped with the engine 4, and the motor generator 6 to drive the engine 4, and the automatic transmission 8. In the vehicle 2, the driving force is generated by the engine 4 and/or the motor generator 6, and is transmitted from the automatic transmission 8 through a differential 10 and driving shafts 12 to driving wheels 14 to drive the vehicle 2.

The engine 4 is equipped with a fuel injection valve 16. The motor generator 6 is connected to the engine 4 and to a battery 20 through an inverter 18, and assists the engine 2 by generating power at least during the running of the vehicle 2. The motor generator 6 is driven by the electric power of the battery 20 to generate the torque to drive the engine 4, and is also driven by the driving force from the driving wheels 14 to generate electric power to charge the battery 20 through the inverter 18.

The automatic transmission 8 in connection with the motor generator 6 includes a torque converter 22 and a gearing section 24. The torque converter 22 is provided with a pump impeller, a turbine rotor wheel, and a stator (not shown). The torque is increased and transmitted from the pump impeller on an input side to the turbine rotor wheel on an output side. The gearing section 24 includes planet gears (not shown), and a frictional engaging element 26 of hydraulic pressure type formed by a clutch and a brake to switch paths for driving force transmission. The frictional engaging element is engaged and disengaged by oil pressure generated by a mechanical oil pressure pump (not shown) driven by the driving force of the engine 4.

The fuel injection valve 16 and the inverter 18 are connected to a control means or unit 30 forming an automatic stop/start controller 28. The control unit 30 includes a vehicle speed sensor 32 to detect the vehicle speed, an engine speed sensor 34 to detect the engine speed, a turbine rotational speed sensor 36 to detect the rotational speed of the turbine rotor wheel in the torque converter 22, a throttle sensor 38 to detect an opening degree of a throttle valve (not shown) of the engine 4, a brake switch 40 to detect a state in which a brake pedal (not shown) of the vehicle 2 is depressed, and a shift position switch 42 to detect a location of a shift lever (not shown) for the automatic transmission 8.

The control unit 30 of the automatic stop/start controller 28 receives various signals output from the sensors 32, 34, 36, 38 and switches 40, 42. When an automatic stop condition is satisfied, the fuel injection valve 16 is prevented from supplying fuel, thereby stopping the engine 4, which automatic stop condition includes, e.g., when the vehicle 2 is stopped while the engine 4 is operating. When an automatic start condition is satisfied, the fuel injection valve 16 begins to supply fuel, thereby starting the engine 4, which automatic start condition includes, e.g., the occurrence of a drive operation during a period when the engine 4 is stopped. Thereby, the engine 4 can be stopped and started without operation of an ignition key (not shown).

Incidentally, the automatic stop condition is set as a condition in which, e.g., the shift lever is in a drive range position and the brake pedal is depressed such that the vehicle 2 is stopped and the throttle valve is opened at an idle opening angle. Also the automatic start condition is set as a condition in which, e.g., the engine 4 has been automatically stopped and the throttle valve is opened past an idle opening degree and the brake pedal is released.

The vehicle 2 is provided with an air conditioner 44 to control the air of the driver's compartment (not shown), in which coolant of the engine 4 is employed as a heat source for heating and the driving force of the engine 4 is employed to drive a compressor (not shown) for cooling. The air conditioner 44 includes a heater core 46 to heat the passing air by circulating therethrough the coolant of the engine 4, an evaporator 48 to cool the passing air by circulating a refrigerant compressed by a compressor, and a cooling fan (not shown). The heater core 46, the evaporator 48, and the cooling fan are disposed in an air conditioning passage 52 defined by an air conditioning duct 50.

The air conditioning duct 50 has the air conditioning passage 52 divided into first and second branch passages 52-1, 52-2 in parallel. The heater core 46 is positioned in the first branch passage 52-1, and an air mix damper 54 is disposed in the second branch passage 52-2. The air mix damper 54 is manually operated to regulate the quantity of air supplied in the first branch passage 52-1 having the heater core 46 disposed therein.

The air conditioning duct 50 includes, in an inlet 56 on an upstream side, an inner air duct 58 to introduce the inside air from the driver's compartment, an outer air duct 60 to introduce the air from outside of the vehicle, an inner air passage 62 in communication with the inlet 56 of the air conditioning passage 52, and an outer air passage 64 in communication with outside of the vehicle. A switching valve 66 is disposed at a position where the air conditioning duct 50 branches into the inner and outer air ducts 58, 60. The switching valve 66 is manually operated to communicate the air conditioning passage 52 with either one of the inner and outer air passages 62, 64. The air conditioning duct 50 has a downstream outlet 68 communicating with the vehicle's interior (not shown).

The air conditioner 44 introduces the inner or outer air from the inlet 56 of the air conditioning duct 50 into the air conditioning passage 52, and heats the passing air by the coolant of the engine 4 as circulated to the heater core 46, or cools the passing air by the refrigerant circulated to the evaporator 48. The heated or cooled air is supplied by the fan to the interior of the vehicle through the outlet 68 of the air conditioning duct 50.

The air conditioner 44 includes a post-evaporator temperature sensor 70 to detect the temperature of the air that has passed the evaporator 48, and an inlet temperature sensor 72 to detect the temperature of the air at the inlet 56 of the air conditioner 44 before passing the evaporator 48. The temperature sensors 70, 72 are connected to the control unit 30. The control unit 30 drives a compressor (not shown) for cooling in accordance with the air temperature detected by the post-evaporator temperature sensor 70.

Figure 4:
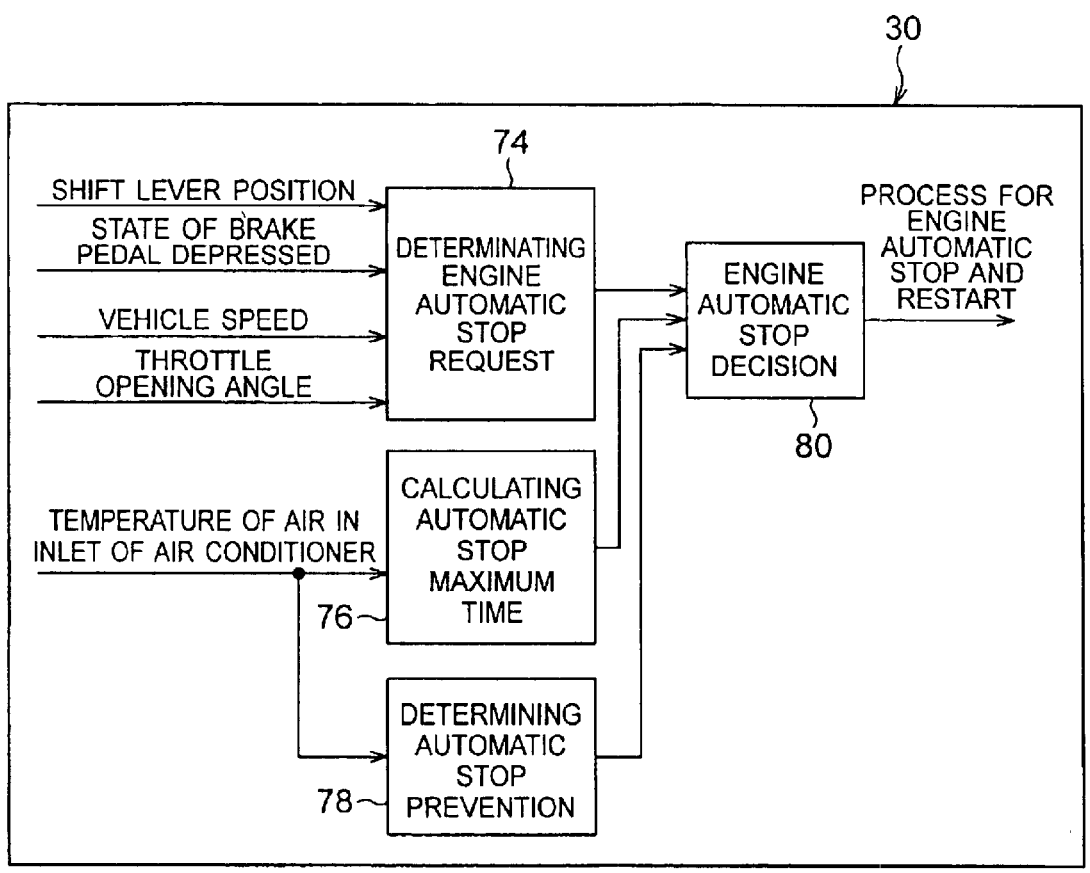
FIG. 4 is a schematic diagram showing the control by the automatic stop/start controller.

Referring to FIG. 4, the control unit 30 of the automatic stop/start controller includes an engine automatic stop request determining section 74, an automatic stop maximum time calculating section 76, an automatic stop prevention determining section 78, and an engine automatic stop determining section 80. More particularly, the engine automatic stop request determining section 74 determines whether the engine 4 is required to stop based on a position of a shift lever, the degree that the brake pedal is depressed, and the opening angle of the throttle. The automatic stop maximum time calculating section 76 calculates the maximum time period for an automatic stop of the engine 4 based on the temperature of the air in the inlet of the air conditioner. The automatic stop prevention determining section 78 determines whether the automatic stop should be prevented by comparison between the temperature of the air in the inlet of the air conditioner with a threshold temperature to prevent the automatic stop of the engine 4. The engine automatic stop determining section 80 decides whether the engine 4 should be automatically stopped based on the signals from the engine automatic stop request determining section 74, the automatic stop maximum time calculating section 76, and the automatic stop prevention determining section 78, then outputs signals to an engine automatic stop/restart processing section (not shown).

Thereby, after the set automatic stop condition is satisfied and the engine 4 is automatically stopped, the control unit 30 of the automatic stop/start controller 26 maintains the automatic stop of the engine 4 while the duration of the automatic stop of the engine is shorter than the automatic stop maximum time set based on the air temperature at the inlet of the air conditioner 44. The control unit 30 executes control by using the automatic stop maximum time only when the air temperature at the inlet of the air conditioner 44 is higher than a predetermined temperature.

Operation of this embodiment is described as follows.

The control unit 30 of the automatic stop/start controller 28 receives the signals from the sensors 32, 34, 36, 38 and the switches 40, 42 and the temperature sensors 70, 72. The engine 4 is stopped when the automatic stop condition is satisfied while the engine 4 is operating, and the engine 4 is started when the automatic start condition is satisfied while the engine 4 is stopped. Thereby, without operation of the ignition key (not shown), the engine 4 can be automatically stopped and started.

Figure 1:
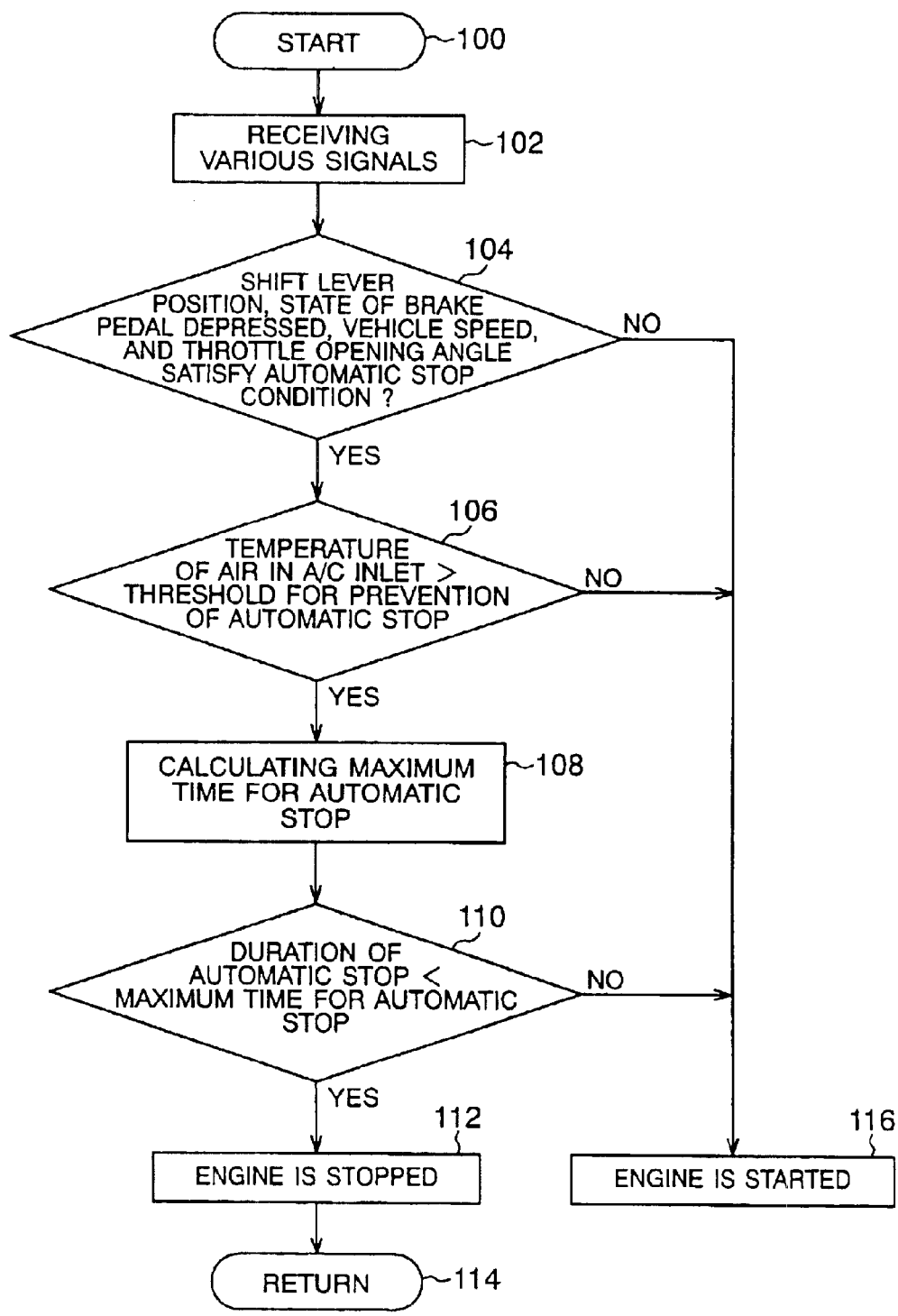
FIG. 1 is a flowchart of an automatic stop/start controller for an engine according to an embodiment of the present invention.

Referring to FIG. 1, at start of the engine without operation of the ignition key, a process for the control unit 30 of the automatic stop/start controller 28 starts at step 100. The control unit 30 of the automatic stop/start controller 28 receives the various signals output from the sensors 32, 34, 36, 38 and the switches 40, 42 and the temperature sensors 70, 72 at step 102. A determination is made at step 104 whether the automatic stop condition is satisfied based on the position of the shift lever, the state that the brake pedal is depressed, and the opening angle of the throttle.

Figure 2:
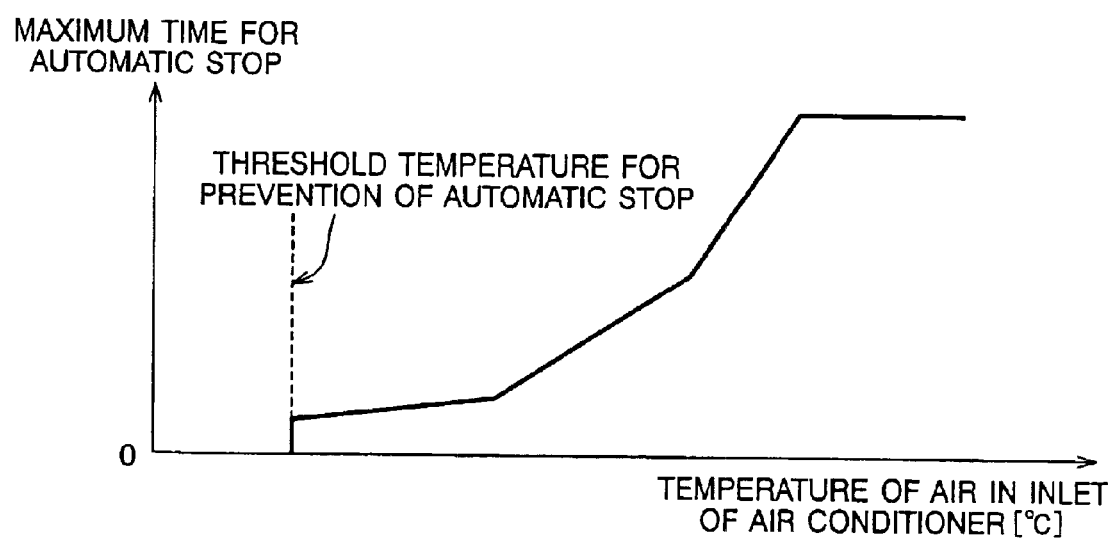
FIG. 2 is a table for calculating an automatic stop maximum time.

If the determination at step 104 is "YES", then another determination is made at step 106 whether the temperature of the air in the inlet of the air conditioner 44 is higher than the threshold temperature for preventing an automatic stop as indicated by dashed line in FIG. 2.

If the determination at step 106 is "YES", the maximum time for the stop of the engine 4 is calculated at step 108 based on the temperature of the air in the inlet of the air conditioner 44 as indicated by the solid line in FIG. 2, and the engine 4 is automatically stopped. A determination is made at step 110 whether the duration of the automatic stop of the engine 4 is shorter than the automatic stop maximum time.

If the determination at step 110 is "YES", then the automatic stop of the engine 4 is maintained at 112, and the process returns at step 114.

On the other hand, if the determination at step 104, 106, or 110 is "NO", the engine is automatically started, and the process returns at step 114.

Thus, after the set automatic stop condition is satisfied and the engine 4 is automatically stopped, the control unit 30 of the automatic stop/start controller 28 maintains automatic stop of the engine 4 as long as the duration of the automatic stop of the engine is shorter than the automatic stop maximum time set based on the temperature of the inlet of the air conditioner 44. Therefore, the engine 4 is started before the temperature of the heater core 46 of the air conditioner 44 becomes too low due to the coolant not circulating to the heater core 46 while the engine 4 is stopped. This prevents degradation of the heating performance due to too low a temperature of the coolant caused by the engine 4 being stopped.

The automatic stop/start controller 28 for the engine 4 also permits more precise heat control by decreasing the automatic stop maximum time in response to a decrease in the temperature of the air in the inlet of the air conditioner 44. Accordingly, maintenance of heating capacity and reduction in fuel consumption, which traditionally have been conflicting goals, are both accomplished by the present invention. Also the control unit 30 executes the control by using the automatic stop maximum time only when the temperature of the inlet of the air conditioner 44 is higher than a predetermined temperature. This prevents the engine 4 from stopping and starting frequently in a short amount of time when the temperature of the inlet of the air conditioner 44 is below the predetermined temperature.

Further, in the automatic stop/start controller for the engine 4, the motor generator 6 assists the engine 4 in generating power at least during the running of the vehicle 2. The automatic stop/start controller can be applied to a hybrid vehicle having the motor generator 6 to drive or assist the engine 4.

The present invention is not limited to the above, but is susceptible to various variations or modifications. In the above-mentioned embodiment, stop of the engine 4 is maintained when the duration of the automatic stop of the engine 4 is shorter than the automatic stop maximum time. However, by controlling such that the motor generator 6 is driven to operate the engine 4 while the engine 4 is automatically stopped, the coolant of the engine 4 can continue to be circulated to the heater core 46 of the air conditioner 44, thereby preventing degradation in the heating capacity due to the engine 4 being stopped.

In addition, by switching the switching valve 66 of the air conditioner 44 to communicate the inner air passage 62 with the air conditioning passage 52 while the engine 4 is automatically stopped, the air in the driver's compartment can be circulated into the air conditioning passage 52 to prevent the decrease in the temperature of the air heated by the heater core 46. This also prevents degradation of the heating capacity due to the decrease in the coolant temperature while the engine 4 is stopped.

As thus described, the automatic stop/start controller for the engine according to the present invention assures that the engine 4 can be started before the temperature of the air conditioner becomes too low due to the coolant not being circulated to the air conditioner while the engine is stopped. This prevents degradation of the heating performance due to the low temperature of the coolant while the engine is stopped.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. An automatic stop/start controller for a vehicle engine having an air conditioner which employs a coolant or driving force of said engine to control the air temperature in a vehicle interior, said engine capable of stopping and starting without operation of an ignition key, wherein after a predetermined automatic stop condition is satisfied and said engine is automatically stopped, a control unit maintains said engine in a stopped state as long as the duration of the automatic stop of said engine is shorter than an automatic stop maximum time period that is based on air temperature at an inlet of said air conditioner.

2. The automatic stop/start controller for the engine as defined in claim 1, wherein said control unit executes control by means of the automatic stop maximum time period only when the air temperature at said inlet of said air conditioner is higher than a predetermined temperature.

3. The automatic stop/start controller for the engine as defined in claim 1, wherein a motor generator assists said engine in generating power at least during running of said vehicle.

4. The automatic stop/start controller for the engine as defined in claim 2, wherein a motor generator assists said engine in generating power at least during running of said vehicle.

5. A vehicle, comprising:
- an internal combustion engine, an electric motor-generator drivingly connected to the engine to assist in driving of the engine when functioning as a motor, and a transmission drivingly connecting the engine to vehicle wheels;
- an air conditioner having a compressor driven from the engine for effecting cooling of the vehicle driver's compartment and having a heater core supplied with heated coolant from the engine for effecting heating of the vehicle driver's compartment, said air conditioner also having an inlet passage for supplying air to the heater core or the compressor, and an outlet passage for supplying air from the air conditioner to the driver's compartment; and
- a start-stop controller for controlling automatic start and automatic stop of the engine without use of an ignition key;
- said controller including a control unit which, after a predetermined automatic stop condition is satisfied and said engine is automatically stopped, maintains said engine in a stopped state as long as the duration of the automatic stoppage of the engine is less than a maximum automatic stop time period that is determined based on air temperature at the inlet passage of said air conditioner.

6. The vehicle according to claim 5, wherein said control unit controls start up of said engine by driving said motor when the duration of the automatic stop exceeds the maximum automatic stop time period.

7. The vehicle according to claim 5, wherein the control unit permits an automatic stop of the engine to occur only if the inlet air temperature to the air conditioner exceeds a determined threshold temperature.

8. A process for controlling automatic start/stop of an internal combustion engine of a vehicle having an electric motor-generator drivingly coupled to the engine and also having an air conditioner provided with a compressor driven by the engine for supplying cooling air to the vehicle driver's compartment and having a heater supplied with heated coolant from the engine for supplying heated air to the driver's compartment, and a controller for permitting automatic stop/start of the engine without using an ignition key, comprising the steps of:
- determining whether conditions for an automatic stop of the engine are satisfied by sensing at least the shift lever position, the depression of the brake pedal, and the throttle opening angle;
- determining if the temperature of the inlet air to the air conditioner exceeds a defined threshold temperature;
- determining a maximum time interval for an automatic stoppage of the engine based on the temperature of inlet air to the air conditioner;
- stopping the engine if the automatic stop conditions are satisfied and the inlet air to the air conditioner exceeds said threshold temperature; and then
- maintaining the stoppage of the engine only so long as the duration of the stoppage is less than the determined maximum time interval.

* * * * *